US011429687B2

(12) United States Patent
Rudden et al.

(10) Patent No.: US 11,429,687 B2
(45) Date of Patent: Aug. 30, 2022

(54) CONTEXT BASED URL RESOURCE PREDICTION AND DELIVERY

(71) Applicant: KYNDRYL, INC., New York, NY (US)

(72) Inventors: Mary E. Rudden, Denver, CO (US); Shikhar Kwatra, Durham, NC (US); Raghuveer Prasad Nagar, Kota (IN); Reji Jose, Bangalore (IN); Jeremy R. Fox, Georgetown, TX (US)

(73) Assignee: KYNDRYL, INC., New York, NY (US)

(*) Notice: Subject to any disclaimer, the term of this patent is extended or adjusted under 35 U.S.C. 154(b) by 266 days.

(21) Appl. No.: 16/598,049

(22) Filed: Oct. 10, 2019

(65) Prior Publication Data

US 2021/0109986 A1    Apr. 15, 2021

(51) Int. Cl.
| | | |
|---|---|---|
| *G06F 16/00* | (2019.01) | |
| *G06F 16/955* | (2019.01) | |
| *G06K 9/62* | (2022.01) | |
| *G06F 16/9035* | (2019.01) | |
| *G06F 16/953* | (2019.01) | |
| *G06F 16/2457* | (2019.01) | |

(52) U.S. Cl.
CPC .... *G06F 16/9558* (2019.01); *G06F 16/24575* (2019.01); *G06F 16/9035* (2019.01); *G06F 16/953* (2019.01); *G06F 16/9566* (2019.01); *G06K 9/6267* (2013.01)

(58) Field of Classification Search
CPC ................................................ G06F 16/24575
See application file for complete search history.

(56) References Cited

U.S. PATENT DOCUMENTS

| | | | |
|---|---|---|---|
| 6,757,707 B1 | 6/2004 | Houghton | |
| 8,001,457 B2 | 8/2011 | Rosenoff | |
| 9,086,794 B2 | 7/2015 | Gil | |
| 9,524,280 B2 | 12/2016 | Gorelick | |
| 9,690,786 B2 | 6/2017 | Berry | |
| 2011/0125727 A1* | 5/2011 | Zou | G06F 16/137 |
| | | | 707/711 |
| 2015/0254216 A1 | 9/2015 | Deluca | |
| 2016/0191664 A1* | 6/2016 | Balakrishnan | H04L 67/2857 |
| | | | 709/203 |
| 2019/0319868 A1* | 10/2019 | Svennebring | H04L 41/147 |

OTHER PUBLICATIONS

Engelhardt et al., "Semantic Linking—a Context-Based Approach to Interactivity in Hypermedia", Hochschulrechenzentrum, Fachhochschule fur Technik und Wirtschaft Berlin, Treskowallee 8, D-10318 Berlin, 12 pages.
Lemon, Gez, "Providing Context for Ambiguous Link Phrases", Posted on Sunday, Dec. 2, 2007, 9 pages, <https://developer.paciellogroup.com/blog/2007/12/providing-context-for-ambiguous-link-phrases/>.

* cited by examiner

*Primary Examiner* — Ajith Jacob
(74) *Attorney, Agent, or Firm* — Erik Swanson; Andrew M. Calderon; Roberts Calderon Safran & Cole, P.C.

(57) ABSTRACT

Embodiments of the present invention provide a computer system, a computer program product, and a method that comprises generating a context-based query through based on a received input; finding a result of the generated query using link prediction algorithm coupled with link prefetching algorithm; and generating a specific link that illustrates and matches the generated context-based query.

17 Claims, 4 Drawing Sheets

```
import string
import nltk
stopwords= nltk.corpus.stopwords.words('english') def pure(sentence):
s = "".join(x for x in sentence if x not in string.punctuation) temp =
s.lower().split(' ')
words = [x for x in temp if x not in stopwords]
return words
vect = TfidfVectorizer(analyzer=pure)
vector_output = vect.fit_transform(data[user_input])
pd.DataFrame(vector_output.toarray()). Stored in primary
array
Vect2 = TfidfVectorizer(analyzer=pure)
Vector2_output = vect2.fit_transform(data[website]) pd.DataFrame(vector2_output.toarray()) –
stored in different array
x_features = pd.concat([data['tf_idf_output'],data['user'],data['site
rank'],data['website'],pd.DataFrame(vector_output.toarray())],axis=1)
x_train, x_test, y_train, y_test = train_test_split(x_features,data['label'])
rf = RandomForestClassifier(n_estimators=100, max_depth=None)
rf_model = rf.fit(x_train,y_train)
return open_display()
#display jscript (website link) -> Multiple output options here as mentioned above
def open(): return urllib.urlopen('link')
```

FIG. 3

CONTEXT BASED URL RESOURCE PREDICTION AND DELIVERY

FIELD OF THE INVENTION

The present invention relates generally to the field of URLs, and more particularly to link prediction and link prefetching within the field of URLs.

BACKGROUND

A uniform resource locator ("URL") is generally a reference to a web resource that specifies its location on a computer network and a mechanism for retrieving it. Typically, the navigation and browsing of URLs is completed via hyperlinks. A hyperlink, or a link, is a reference to data that a reader can follow by clicking or tapping, and a link may point to a whole document or to a specific element within a document.

Link prediction is used to predict future possible links in a network, or it can be used to predict missing links due to incomplete data. This prediction of links is usually completed by link prediction algorithms, which are used to predict the possible new relationships that can be created. Link prediction algorithms can be based on three different approaches: a local similarity, a global similarity and a feature vector that can be considered a rank and rating system. Similarly, link prefetching allows web browsers to pre-load resources and is accomplished by keywords or hints in links or web pages. Common forms of link prediction algorithms are Linear Discriminant Analysis ("LDA") and Random Forest classifier technique.

LDA is a dimensionality reduction technique that will separate classes and will reduce the dimensionality of the data set. LDA will generally characterize or separate two or more classes of objects or events, look for linear combinations of variables that best explain the data, and attempts to model the difference between the classes of data. The Random Forest classifier technique is typically defined as a method for classification, regression and other tasks by constructing a multitude of decision trees and outputting the class that is the mode or mean prediction of the individual trees. The Random Forest classifier technique may correct for decision tree's habit of overfitting to their training set.

SUMMARY

Embodiments of the present invention provide a computer system, a computer program product, and a method that comprises generating a context-based query through based on a received input; finding a result of the generated query using link prediction algorithm coupled with link prefetching algorithm; and generating a specific link that illustrates and matches the generated context-based query.

BRIEF DESCRIPTION OF THE DRAWINGS

FIG. 3 is an example of a code fragment for a program with the ability of running a link prediction and link prefetching task, in accordance with an embodiment of the present invention.

DETAILED DESCRIPTION

Embodiments of the present invention recognize the need for ways to provide more efficient search ability of content using specific link prediction algorithms in an environment comprised of computing devices. Embodiments of the present invention provides systems, methods, and computer program products for an improvement to existing search systems. Currently, common search systems known in the art lack a way to identify resources within a URL directory, such as one found on a website, based on context and then return a result that points to a specific resource in a URL that satisfies the query (as opposed to returning a URL that opens the home page of a website that forces the user to find the resource that satisfies the query). For example, a user inputs text on a webpage that states, "the last verse of the last hit song of Michael Jackson." Embodiments of the present invention generates a result that would, when selected by the user, take a user directly to the last verse of that song. Accordingly, embodiments of the present invention can retrieve, gather, rank, rate, sort, classify and relay specific portions of a source document that are relevant to a keyword or a key phrase used in a browser on a user's computing device and can provide a more efficient alternative to research.

Figure 1:
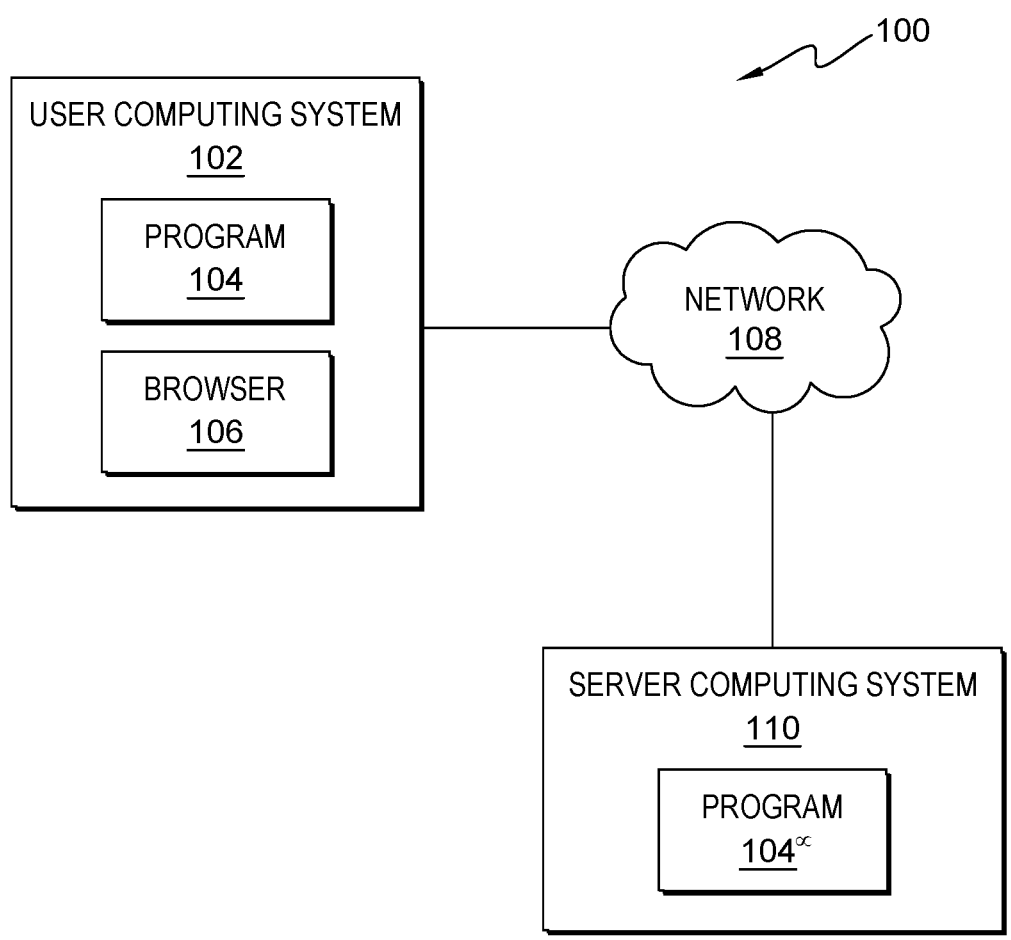
FIG. 1 is a functional block diagram depicting an environment with a computing device connected to or in communication with another computing device in accordance with at least one embodiment of the present invention.

FIG. 1 is a functional block diagram of a computing environment 100 in accordance with an embodiment of the present invention. The computing environment 100 includes a user computing system 102 and a server computing system 110. The user computing system 102 and the server computing system 110 may be desktop computers, laptop computers, specialized computer servers, or any other computer systems known in the art. In certain embodiments, the user computing system 102 and the server computing system 110 may represent computer systems utilizing multiple computers or components to act as a single pool of seamless resources when accessed through a network 108. Generally, the user computing system 102 and the server computing system 110 may be representative of any electronic devices, or a combination of electronic devices, capable of executing machine-readable program instructions, as described in greater detail with regard to FIG. 4.

The user computing system 102 may include a program 104 and a browser 106. The program 104 is an instance of program 104∝ and has all the functional capabilities of program 104∝. In this embodiment, the program 104 may be a stand-alone program installed on the user computing system 102 and may function as an add-on extension of the browser 106. In general, the program 104 receives the content input into the browser 106 and communicates that input with the program 104∝ on the server computing system 110 via the network 108. In this embodiment, the program 104 may include a link prediction algorithm and a link prefetching algorithm, such as a linear discriminant analysis ("LDA") classification technique in conjunction with the Random Forest classification technique. LDA will reduce the dimensionality of the data set, separate classes, look for linear combinations of variable that best explain the content and attempt to model the difference between the relevant content. Random Forest classification technique will classify, regress and perform other tasks that operate the search of any relevant content by constructing a multitude of decision trees. The mode of the classes and the mean prediction of the individual trees will correct the overfitting of the decision trees. In other embodiments, the program 104 may be a graphic user interface that provides control functions for generating search queries based on context, searching for resources that satisfy the generated search queries, and returning as a result one or more resources that satisfy the generated search query. In other embodiments, the program 104 may generate a unique resource locater that, when interacted with, (e.g., selected by the user via an input mechanism) displays the specific resource that satisfies the generated context-based query. In additional embodiments, the program 104 may use non-discriminant analysis, discriminant function analysis or Fischer's linear discriminant to rank and retrieve relevant content to the content that was input into the browser 106.

The browser 106 can be implemented using a browser and web portal or any other program that transmits search queries to, and receives results from, the server computing system 110. For example, the browser 106 navigates to a blog, a legal document, a webpage (and content within the blog, legal document, webpage) or any other user interface that allows for display of characters and media. In another embodiment, the browser 106 may display a blog, a legal document, a webpage or any other user interface that allows for implementation of characters. Furthermore, the browser 106 may be implemented with any suitable storage architecture known in the art, such as a database.

The network 108 can be a local area network ("LAN"), a wide area network ("WAN") such as the Internet, or a combination of the two; and it may include wired, wireless or fiber optic connections. Generally, the network 108 can be any combination of connections and protocols that will support communication between the user computing system 102 and the server computing system 110, specifically the program 104 in accordance with a desired embodiment of the invention.

The server computing system 110 includes the program $104^\infty$ that received and interpreted the data from the browser 106 on the user computing system 102. In at least one embodiment, the program $104^\infty$ on the server computing system 110 gathers the transmitted data received by the user computing system 102, ranks and retrieves any relevant content that pertains to the keywords or key phrases input into the browser 106, generates the specific content that most closely relates to the initial content input into the browser 106, and transmits that content to the user computing system 102 via the network 108. The program $104^\infty$ on the server computing system 110 may rank and retrieve content based on various factors such as popularity of a link, topics trending on social media links, quality of the source, browsing and purchaser history of the user, confidential and privacy settings of the link, and any other factor that may assist the program $104^\infty$ in ranking and classifying content. In other embodiments, the program $104^\infty$ may also rank and retrieve content based on the operating system of the searching device, user's preferred spoken language, geographical area, complexity of the user's profile and other personalization traits based on the user's subject knowledge level. In another embodiment, the program $104^\infty$ may generate a unique resource locater that, when interacted with, (e.g., selected by the user via an input mechanism) displays the specific resource as displayable content that satisfies the generated context-based search query and transmits that generated link to one or more components of the computing environment 100 via the network 108. In another embodiment, the program $104^\infty$ may modify the ranking and selecting of relevant content.

Figure 2:
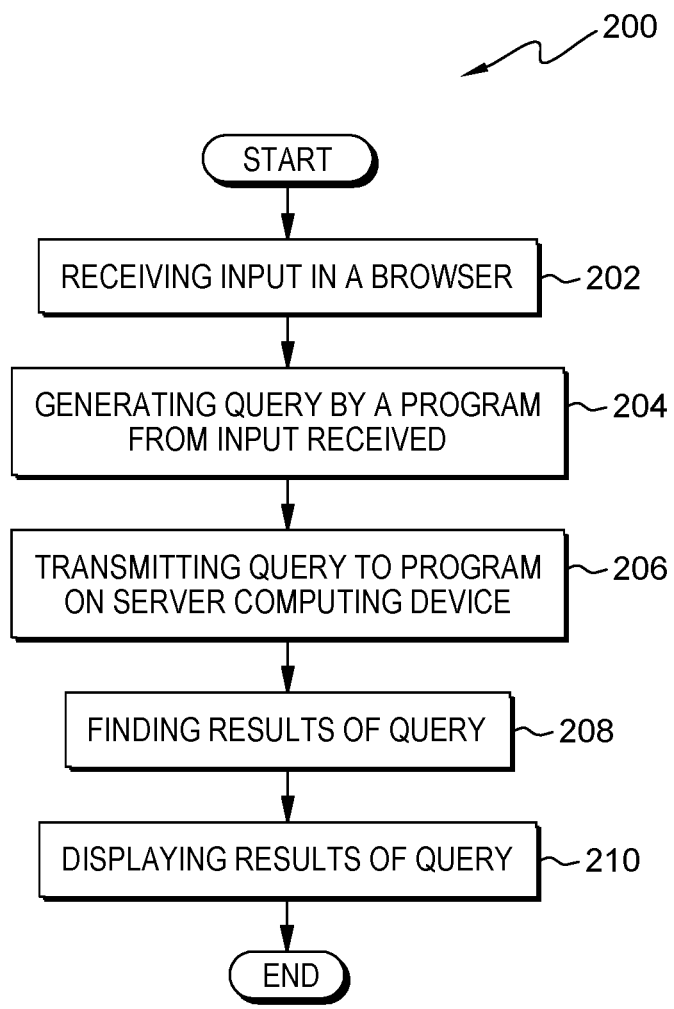
FIG. 2 is a flowchart illustrating operational steps for running a link prediction and link prefetching program task, in accordance with an embodiment of the present invention.

FIG. 2 is a flowchart 200 illustrating operational steps for running a link prediction and link prefetching program task, in accordance with an embodiment of the present invention.

In step 202, a program 104 receives an input in a browser 106. In this embodiment, the input is received on a user computing system 102, and the input comprises a resource material such as audio input, visual input, textual input or any combination of those resource materials. The program 104 may comprise link prediction algorithm, link prefetching algorithm, or a combination of the algorithms capable of receiving resource input. For example, the resource input comprises a key word or key phrase in a website, blog, or word document that is then received by the program 104 in order to facilitate the subsequent steps.

In step 204, the program 104 generates a context-based query from the input received in the browser 106. The program 104 generates the context-based query from the input received in direct response to the resource material received from the browser 106. In this present embodiment, the program 104 may rank and retrieve relevant content in direct response to receiving that initial input. In this embodiment, the program 104 may use a plethora of variables in order to generate an accurate query that as relative to the content initially received by the browser 106. In an embodiment, there is at least an 81% confidence that the generated context-based query of the program 104 matches the content that was input in the browser 106. A generated context-based query is defined by the context of the input received. For example, the user reads a blog about the last hit song of Elvis Presley in the description in the blog message, and the program 104, in response to the user selecting the text about the hit song, identifies the context of the blog and determines that the hit song was in 2007 (e.g., based on the date of the post or based on other references in the blog like the user including a pop culture event or current event at the time of the song). These variables may include the popularity of a link, the topics trending on social media, the browsing and purchase history of the user, the operating system of the searching device, the spoken language of the user, the geographical area of the user, the complexity of the user's profile, the level of knowledge of the user, confidentiality and privacy of the user, and any combination of these variables. For example, once a certain resource material, such as "the second paragraph of the United States Constitution," is input into the browser 106, then the program 104 generates a context-based query in response to the input and ranks and retrieves relevant content in relation to the second paragraph of the United States Constitution.

In step 206, the program 104 transmits and communicates the generated context-based query and accompanying instructions to find results that satisfy the context-based query. For example, the program 104 transmits the generated context-based query via a LAN, a WAN or fiber optics. In other embodiments, the program 104 may transmit the generated context-based query to one or more other components of the computing environment 100 using any suitable transmission method known in the art.

In step 208, the program $104^\infty$ finds a result of the context-based query generated and transmits the results to the program 104 according to the instructions of the program 104. As used herein, the result can be one or more resources of source material. In this embodiment, the result of the query finds specific links that satisfy the generated context-based query as displayable content. In this embodiment, a source material refers to content displayed in any number of media formats including text, audio, visual, and any combination of the media formats. For example, where the resource material is a website, a resource can be one or more specific links, images, text, audio, or video on that website. In another embodiment, the result can be a compilation of one or more resources from one or more different source materials in one downloadable format as a downloadable file. In another embodiment, the result may be based on the context derived in step 204. In at least one embodiment, the program 104∞ gathers relevant content in response to the generated context-based query based on the context of the input and ranks and retrieves relevant content using variable factors. Relevant content is defined as content that matches at least 81% of the generated context-based query transmitted by the program 104. In contrast, conventional search systems do not use link prediction algorithm coupled with link prefetching algorithm. The coupling of these algorithms allows for a greater percentage of matching of the generated context-based query to be attained. Once the generated context-based query is transmitted to the program 104∞, the program 104∞ may use link prediction algorithm or link prefetching algorithm to rank, sort, classify and find results based on the content that directly relates to the input that generated the query in the program 104 on the user computing system 102. In one embodiment, the program 104∞ may modify a selection and ranking of relevant content based on the link predication algorithm coupled with the link prefetching algorithm. In another embodiment, the program 104∞ may be a graphic user interface that provides control functions for finding results of the generated search queries based on context and resources. For example, the program 104 on the user computing system 102 generates a query pertaining to a specific scene of a movie, and the program 104∞ on the server computing system 110 gathers relevant video content of that scene and finds a result of the generated context-based query.

In step 210, the program 104 displays the results of the generated context-based query. In this embodiment, the program 104 retrieves and organizes the results of the query in a way that accurately displays the results of the generated query. This display of results may be in the same resource material as the input received by the program 104 on the user computing system 102 or in another relevant form of resource material. In another embodiment, the program 104∞ may display the result on the server computing system 110. In another embodiment, the program 104 may display the specific link that matches the result of the context-based generated query as displayable content. For example, the displayed result would be the specific link that matches the generated context-based query. In this embodiment, the program 104 generates a link that specifically directs the user to the specific area that illustrates the resource material satisfying the generated context-based query. For example, the result of the program 104 displays the link that directs the user to the specific paragraph of the document that satisfies the generated context-based query. In another embodiment, the program 104 may display a portion of the resource material and compile similar portions into a single document that the user may download. For example, the result of the program 104 downloads a display of complied links that directs the user to multiple verses of multiple songs that a particular artist was featured on, which would satisfy the generated context-based query. In another embodiment, the result may be complied links to the lyrics, the actual portion of the lyrics that would satisfy the query and audio portions (e.g., minutes 2:00 to 2:10) that contain the lyrics. The program 104 may display the results of the query based on the variable factors it used to rank, sort, classify and retrieve the relative content of the generated query. The display of the results of the query will be a direct answer to the generated query that was transmitted to the program 104. For example, the program 104 may generate a context-based query of resource material in the form of text, and the program 104 may display an organized result of links from the query in the form of visual resource material.

FIG. 3 is an example of a code fragment 300 illustrating a program with the ability of running a link prediction and link prefetching task, in accordance with an embodiment of the present invention. This example shows the pathway that follows the flowchart illustrated in FIG. 2. In this embodiment, a vectorizer 302 (not shown in FIG. 2) is a component of a program 104. In this embodiment, the vectorizer 302 will receive the input in the program 104 and convert the input into columns. Generally, the columns will be assigned values, and the values will be assigned based on term frequency-inverse document frequency ("TF-IDF"). TF-IDF is a numerical statistic that is intended to reflect how important a word is to a document in a collection or corpus.

After assigning a value to the columns, the TF-IDF will perform a ranking of relevant links and websites that contain relevant content pertaining to the context found using a method of mapping. The method of mapping may comprise one method or many methods working in unison to produce results in response to the input received by the vectorizer 302.

Following the mapping of the relevant links and websites, the program 104 will concatenate data output from what was input into the user computing system 102 and matched to relevant links and websites based on context. In general, string concatenation is the operation of joining character strings end-to-end or linking together data in a chain or a series. Following the concatenation of relevant content, a Random Forest Classifier 304 will perform an operation. In this embodiment, the Random Forest Classifier 304 may test a new input data based on rank context and extract the ranked website link to generate a result to the input content. The Random Forest Classifier 304 may display this result as an annotation, legend or footnote.

Figure 4:
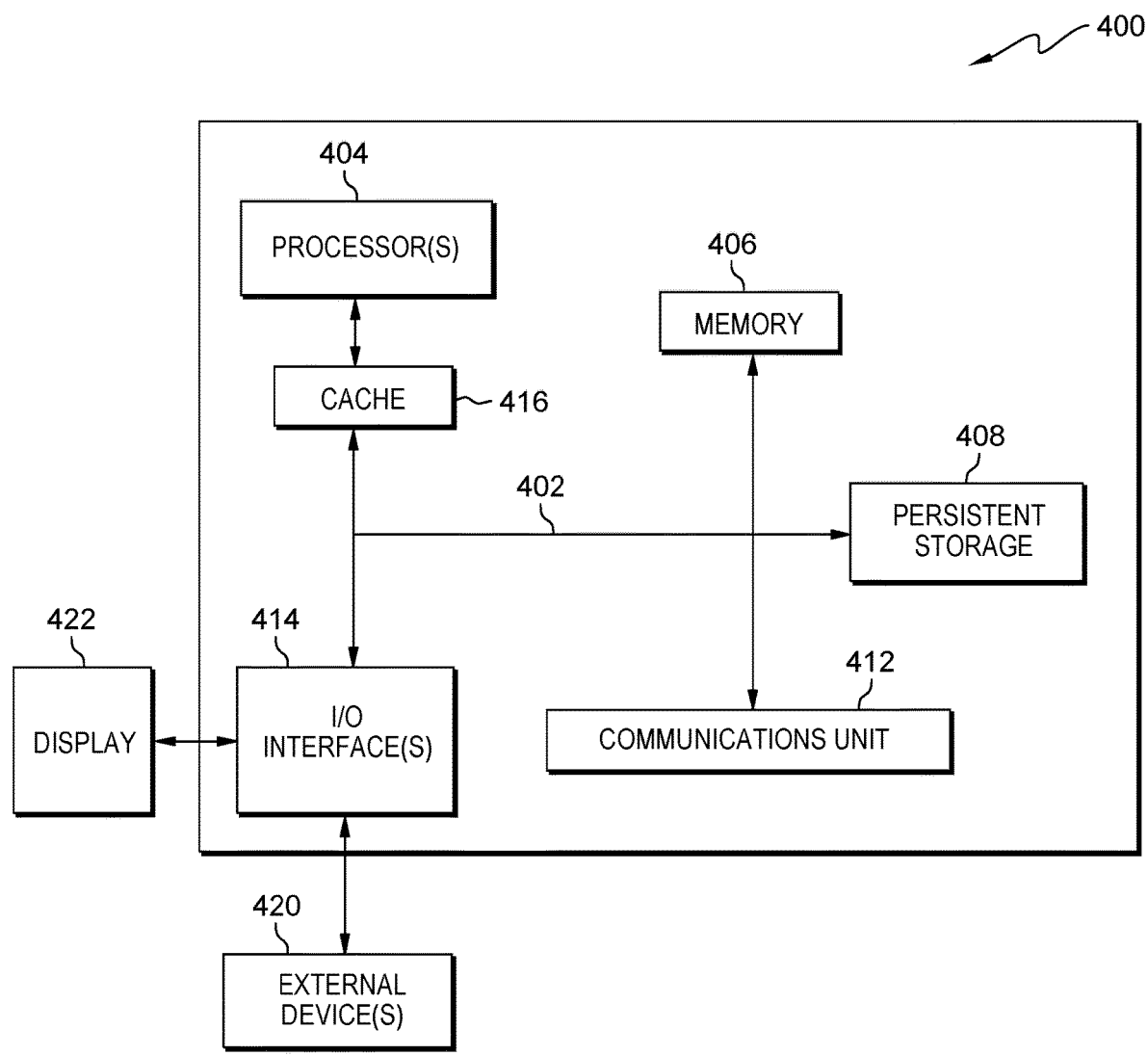
FIG. 4 is a block diagram of internal and external components of the computer systems of FIG. 1, in accordance with an embodiment of the present invention.

FIG. 4 depicts a block diagram of components of computing systems within a haptic display environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 410, and an input/output (I/O) interface(s) 412. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 includes one or more network interface cards. The communications unit 410 may provide communications through the use of either or both physical and wireless communications links. The program 104 may be downloaded to the persistent storage 408 through the communications unit 410.

The I/O interface(s) 412 allows for input and output of data with other devices that may be connected to a mobile device, an approval device, and/or the server computing system 110. For example, the I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 412. The I/O interface(s) 412 also connect to a display 420.

The display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    generating a context-based query through based on a received input;
    finding a result of the generated query using a link prediction algorithm coupled with a link prefetching algorithm; and
    generating a specific link that illustrates and matches the generated context-based query,
    wherein the result comprises a compilation of plural resources from plural different source materials in one downloadable format as a downloadable file, and
    the link prediction algorithm coupled with link prefetching algorithm comprises linear discriminant analysis classification technique in conjunction with a Random Forest classification technique.

2. The computer-implemented method of claim 1, wherein generating a query through a program comprises ranking each of the one or more link resources using a rank and retrieve algorithm that considers factors selected from a group consisting of:
    user preferences via a user profile, popularity of a link, trending topics, browser history of the user, quality of link, and confidential and privacy settings of the link.

3. The computer-implemented method of claim 1, wherein finding a result of the generated query comprises matching at least 81% of relevant content of the input.

4. The computer-implemented method of claim 1, wherein generating a specific link that illustrates and matches the generated query comprises generating a link that specifically directs a user to a specific area of displayable content that satisfies the generated query.

5. The computer-implemented method of claim 1, further comprising:
    selecting one or more links meeting or exceeding at least 81% of a relevant content of the input and presenting the selected one or more links as a downloadable display of multiple links that is collated and presented as a footnote.

6. The computer-implemented method of claim 1, further comprising:
    ranking one or more links meeting or exceeding at least 81% of a relevant content of the received input considering multiple user preferences.

7. The computer-implemented method of claim 1, further comprising:
    modifying a selection and rank of one or more links meeting or exceeding at least 81% of a relevant content of the input using an alternative ranking and retrieving algorithm.

8. The computer-implemented method of claim 1, further comprising:
    compiling multiple portions of different resources that satisfy the generated context-based query into a downloadable file.

9. A computer program product comprising:
    one or more computer readable storage media and program instructions stored on the one or more computer readable storage media, the program instructions comprising:
    program instructions to generate a context-based query through based on a received input;
    program instructions to find a result of the generated query using a link prediction algorithm coupled with a link prefetching algorithm; and
    program instructions to generate a specific link that illustrates and matches the generated context-based query,
    wherein the link prediction algorithm coupled with link prefetching algorithm comprises a linear discriminant analysis classification technique in conjunction with a Random Forest classification technique.

10. The computer program product of claim 9, wherein the program instructions to generate a query through a program comprise program instructions to rank each of the one or more link resources using a rank and retrieve algorithm that considers factors selected from a group consisting of:
   user preferences via a user profile, popularity of a link, trending topics, browser history of the user, quality of link, and confidential and privacy settings of the link.

11. The computer program product of claim 9, wherein the program instructions to find a result of the generated query comprise program instructions to match at least 81% of relevant content of the input.

12. The computer program product of claim 9, wherein the program instructions to generate a specific link that illustrates and match the generated query comprise program instructions to generate a link that specifically directs a user to a specific area of displayable content that satisfies the generated query.

13. The computer program product of claim 9, one or more computer readable storage media and program instructions stored on the one or more computer readable storage media, the program instructions further comprise:
   program instructions to select one or more links meeting or exceeding at least 81% of a relevant content of the input and present the selected one or more links as a downloadable display of multiple links that is collated and presented as a footnote.

14. A computer system comprising:
   one or more computer processors;
   one or more computer readable storage media; and
   program instructions stored on the one or more computer readable storage media for execution by at least one of the one or more processors, the program instructions comprising:
      program instructions to generate a context-based query through based on a received input;
      program instructions to find a result of the generated query using a link prediction algorithm coupled with a link prefetching algorithm; and
      program instructions to generate a specific link that illustrates and matches the generated context-based query,
   wherein the link prediction algorithm coupled with link prefetching algorithm comprises a linear discriminant analysis classification technique in conjunction with a Random Forest classification technique.

15. The computer system of claim 14, wherein the program instructions to generate a query through a program comprise program instructions to rank each of the one or more link resources using a rank and retrieve algorithm that considers factors selected from a group consisting of:
   user preferences via a user profile, popularity of a link, trending topics, browser history of the user, quality of link, and confidential and privacy settings of the link.

16. The computer system of claim 14, wherein the program instructions to find a result of the generated query comprise program instructions to match at least 81% of relevant content of the input.

17. The computer system of claim 14, wherein the program instructions to generate a specific link that illustrates and match the generated query comprise program instructions to generate a link that specifically directs a user to a specific area of displayable content that satisfies the generated query.

* * * * *